(12) United States Patent
Sossong

(10) Patent No.: US 9,939,537 B2
(45) Date of Patent: Apr. 10, 2018

(54) SENSOR FUSION WITH MUON DETECTOR ARRAYS TO AUGMENT TOMOGRAPHIC IMAGING USING AMBIENT COSMIC RAYS

(71) Applicant: Decision Sciences International Corporation, Poway, CA (US)

(72) Inventor: Michael James Sossong, Ramona, CA (US)

(73) Assignee: Decision Sciences International Corporation, Poway, CA (US)

(*) Notice: Subject to any disclaimer, the term of this patent is extended or adjusted under 35 U.S.C. 154(b) by 46 days.

(21) Appl. No.: 15/065,638

(22) Filed: Mar. 9, 2016

(65) Prior Publication Data

US 2016/0291197 A1    Oct. 6, 2016

Related U.S. Application Data

(60) Provisional application No. 62/130,869, filed on Mar. 10, 2015.

(51) Int. Cl.
*G01T 1/167* (2006.01)
*G01T 3/00* (2006.01)
*G01V 5/00* (2006.01)

(52) U.S. Cl.
CPC .............. *G01T 3/008* (2013.01); *G01T 1/167* (2013.01); *G01V 5/0075* (2013.01)

(58) Field of Classification Search
CPC ........ G01V 5/0091; G01T 1/167; G01T 3/008
See application file for complete search history.

(56) References Cited

U.S. PATENT DOCUMENTS

| 5,034,610 | A  |   | 7/1991 | Spacher et al. |
| 5,481,501 | A  | * | 1/1996 | Blakeslee ............... G01V 1/42 367/57 |
| 5,886,255 | A  | * | 3/1999 | Aronstam ............... E21B 47/00 166/254.1 |
| 6,894,949 | B2 | * | 5/2005 | Aronstam ............... G01V 1/42 367/38 |
| 7,046,581 | B2 | * | 5/2006 | Calvert .................... G01V 1/42 367/38 |

(Continued)

FOREIGN PATENT DOCUMENTS

| WO | 2010/091003 A2 | 8/2010 |
| WO | 2014/051895 A2 | 4/2014 |

OTHER PUBLICATIONS

Borozdin, K.N., et al., "Concept of One-Sided Imaging of SNM Based on Muon-Induced Fission Detection," Los Alamos National Laboratory, Document #LA-UR-12-22232, 30 pages, 2012.

(Continued)

*Primary Examiner* — David Porta
*Assistant Examiner* — Djura Malevic
(74) *Attorney, Agent, or Firm* — Perkins Coie LLP

(57) ABSTRACT

Techniques, systems and apparatus are described for operating a multimode passive detection system (MMPDS). A multimode passive detection system includes charged particle tracking detectors to measure cosmic ray-based charged particle trajectories in a volume of interest. The multimode passive detection system includes fission product detectors to detect cosmic ray-based charged particle induced fission in a fissile material present in the volume of interest.

21 Claims, 8 Drawing Sheets

(56) References Cited

U.S. PATENT DOCUMENTS

| | | | | |
|---|---|---|---|---|
| 7,470,905 | B1* | 12/2008 | Goldberg | G01T 1/2935 250/251 |
| 7,488,934 | B2* | 2/2009 | Bryman | G01T 1/203 250/253 |
| 7,531,791 | B2* | 5/2009 | Bryman | G01T 1/203 250/266 |
| 7,838,841 | B2* | 11/2010 | Morris | G01N 23/20 250/370.1 |
| 7,945,105 | B1* | 5/2011 | Jaenisch | G01V 5/0008 382/128 |
| 8,288,721 | B2* | 10/2012 | Morris | G01T 1/18 250/251 |
| 9,035,236 | B2* | 5/2015 | Anghel | G01N 23/046 250/251 |
| 9,310,323 | B2* | 4/2016 | Bendahan | G01V 5/0016 |
| 9,423,361 | B2* | 8/2016 | Sugita | G01V 5/0016 |
| 9,557,427 | B2* | 1/2017 | Bendahan | G01T 3/008 |
| 2004/0163443 | A1* | 8/2004 | McElhinney | E21B 47/022 73/1.79 |
| 2006/0180753 | A1* | 8/2006 | Bryman | G01T 1/203 250/266 |
| 2006/0289775 | A1 | 12/2006 | Inbar | |
| 2008/0128604 | A1* | 6/2008 | Bryman | G01V 5/04 250/266 |
| 2008/0228418 | A1* | 9/2008 | Green | G01N 23/20 702/81 |
| 2008/0315091 | A1* | 12/2008 | Morris | G01T 1/18 250/307 |
| 2009/0224157 | A1* | 9/2009 | Goldberg | G01T 1/2935 250/358.1 |
| 2010/0065745 | A1* | 3/2010 | Goldberg | G01T 1/2935 250/358.1 |

OTHER PUBLICATIONS

Mitsou, V.A., "Atlas Silicon Microstrip Tracker: Operation and Performance," The ATLAS collaboration, 13th ICATPP Conference on Astroparticle, Particle, Space Physics and Detectors for Physics Applications, Como, Italy, arXiv:1110.1983 [physics.ins-det], pp. 1-5, Oct. 2011.

Ruchti, R.C., "The Use of Scintillating Fibers for Charged-Particle Tracking," Annual Reviews of Nuclear and Particle Science, vol. 46, pp. 281-319, 1996.

International Search Report and Written Opinion dated May 23, 2016 for International Application No. PCT/US2016/021600, filed on Mar. 9, 2016 (7 pages).

* cited by examiner

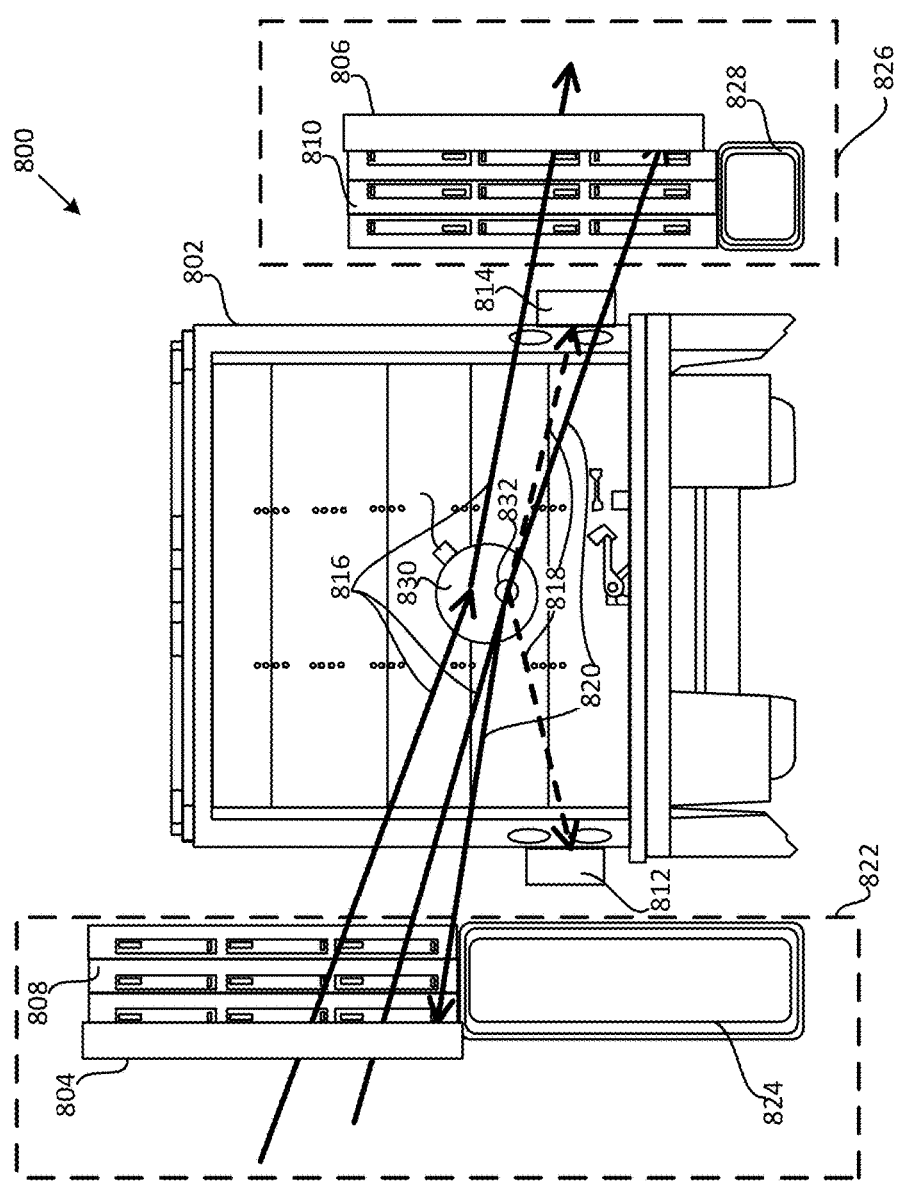
FIG. 7 - Exemplary Multi-Detection Mode System

SENSOR FUSION WITH MUON DETECTOR ARRAYS TO AUGMENT TOMOGRAPHIC IMAGING USING AMBIENT COSMIC RAYS

CROSS REFERENCE TO RELATED APPLICATIONS

This patent document claims the benefit of priority of U.S. Provisional Patent Application No. 62/130,869, filed on Mar. 10, 2015. The entire content of the before-mentioned patent application is incorporated by reference as part of the disclosure of this document.

BACKGROUND

This application relates to devices, techniques and systems for tomographic imaging and detection using ambient cosmic ray charged particles such as muons and electrons as a passive illuminating radiation source.

Particle detector arrays such as those used in research facilities (e.g., European Council for Nuclear Research (CERN) and the Fermi National Accelerator Laboratory (Fermilab)) have been constructed to detect a specified range of particles and/or particle energies for addressing a specific detection problem. Adding different detectors to the arrays have meant modification of the arrays' data acquisition electronics.

SUMMARY

Techniques, systems and apparatus are described for augmenting ambient cosmic ray based tomographic imaging with other particle detectors to extend the range of detection modalities. In a Multi-Mode Passive Detection System (MMPDS), an array of drift-tube sensors can be configured to enable tomographic imaging of a VOI using ambient cosmic rays as the illuminating radiation source. Implementing an open architecture in the MMPDS enables addition of other detectors with great ease to extend the set of detection modalities.

The system, device and techniques described in this document can implemented as part of a inspection system to inspect volumes of interest for the presence of nuclear threats and other contraband or hazardous items, using ambient or controlled-source illuminating radiation. The described systems, devices and techniques can be used in inspection of large trucks and shipping containers. Other potential embodiments can include, for example, inspection of packages, personnel, or facility access points.

BRIEF DESCRIPTION OF THE DRAWINGS

FIG. 4B is a process flow diagram graphically showing an exemplary Data Merger process for converting parallel time streams, already merged into epochs from each group of detector modules, into sequential epoch records.

FIG. 7 is a diagram of an exemplary detection system.

DETAILED DESCRIPTION

Figure 1:
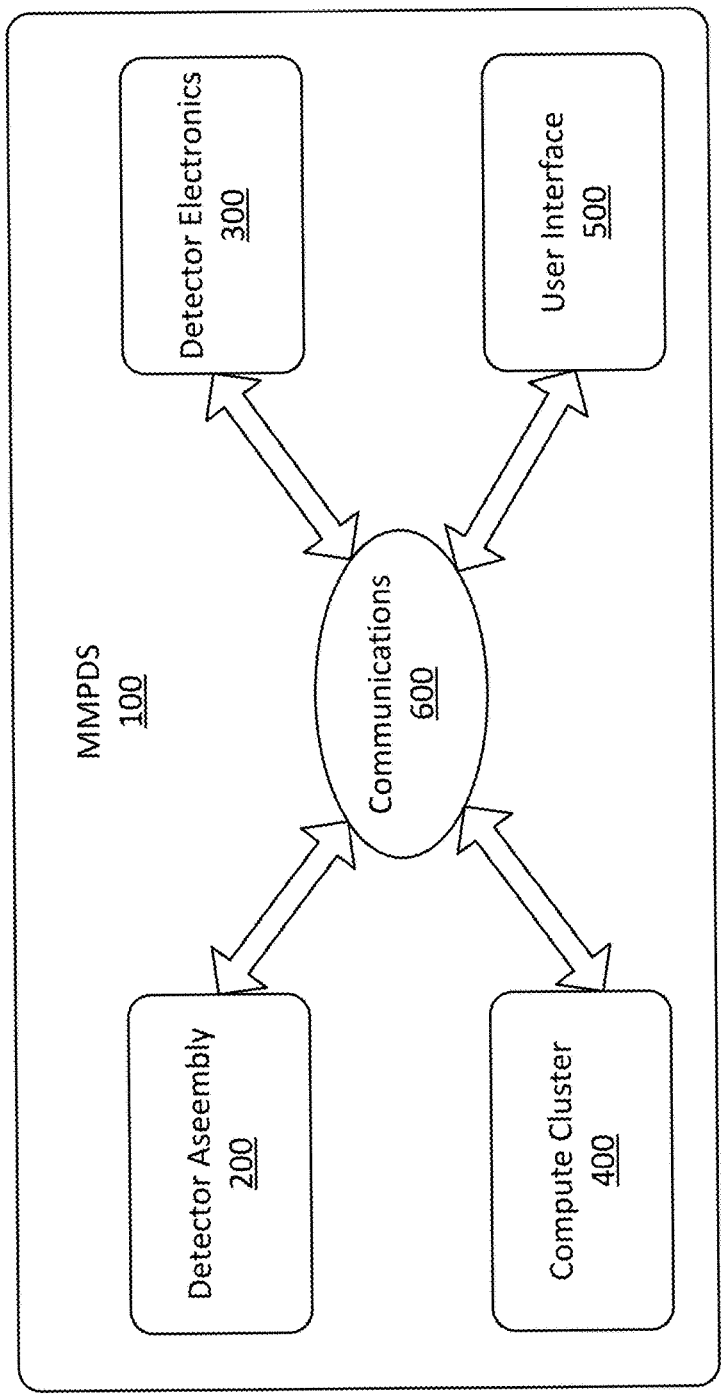
FIG. 1 is a block diagram of an exemplary MMPDS system components and intercomponent communication.

In the following description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In tomographic imaging systems based on a passive source of illuminating radiation, individual cosmic ray charged particles such as muons and electrons showering through a volume of interest (VOI) are tracked to reconstruct a three-dimensional distribution of atomic number (Z) and density of materials in the VOI. Also, the particle imaging and detection system can detect natural emission of gamma rays from materials in the volume of interest (VOI).

Techniques, devices, computer program products and systems can be implemented to utilize an open architecture of the MMPDS detector array to provision auxiliary inputs from additional detectors using the same time base as the core MMPDS detector array. Examples of the additional detectors used to augment the MMPDS can include one or more spectroscopic gamma ray detectors for spectroscopic characterization of gamma rays emitted by any radioactive material inside the VOI. This enables identification of the nuclei undergoing radioactive decay, including natural or stimulated fission, within the VOI.

The type and number of additional detectors that can be used to augment the MMPDS are not limited to the examples listed in this document. The open architecture of the MMPDS detector array allows any type and number of detectors to be easily added to the particle detectors to enhance the utility of the MMPDS array. Moreover, addition detectors can be added without modifications to the arrays' data acquisition electronics.

In another aspect, utilizing the open architecture of the MMPDS can potentially enable mobile implementations of a smaller MMPDS-style array augmented with the auxiliary/additional detectors. Mobile implementations of a smaller MMPDS-style array can be used for 3-D and 2-D imaging.

In addition, the described techniques, systems and apparatus incorporate software modifying data acquisition to handle a higher number of coincident detections, thus enabling the system to operate in high-background-radiation environments.

Open Electronic Architecture with Connectivity for Additional Sensors to Augment MMPDS In an MMPDS, an array of drift-tube sensors can be configured to enable tomographic imaging of a VOI using ambient cosmic rays as the illuminating radiation source. The cosmic ray charged particles, primarily muons and electrons, shower through the VOI, and measurement of individual particle tracks can be used to reconstruct a three-dimensional distribution of atomic number (Z) and density of materials in the VOI. The drift tubes can also sense gamma rays emitted by the decay of lightly shielded radioactive materials within the VOI, providing a second modality to detect contraband including special nuclear materials. Evaluating individual tracks of the cosmic ray charged particles showering through the VOI relies on collection of signals from throughout the array with a time base accuracy in nanoseconds (e.g., 20 nanoseconds) to establish simultaneity of detections occurring at any detector pairs in the array.

To extend the range of detection modalities in the MMPDS, an open architecture of the array electronics is implemented to allow other particle detectors to be incorporated into the array of drift-tube sensors. The data acquisition electronic architecture as described below can be implemented to offer connectivity for additional sensors beyond the dedicated MMPDS drift tube array. Signals coming from these additional sensors are referenced to the same system clock as the MMPDS drift tubes, so they are recorded against the same time base.

Data Acquisition Electronic Architecture

FIG. 1 shows an exemplary MMPDS 100 with four major components. The exemplary MMPDS 100 includes a detector assembly 200, detector electronics or circuitry 300, compute cluster 400, user interface 500, and communications medium 600. The user interface 500 includes one or more graphical user interfaces (GUI) to allow a qualified operator to install, maintain and operate the MMPDS. The detector assembly 200 senses or detects cosmic ray charged particles traversing through a VOI. The detector electronics 300 measures the electrical response of the detector assembly 200 as current pulses and transmits the measured current pulses to the compute cluster 400 to be processed and analyzed. AC main power is provided to the MMPDS system and the provided AC main power can be conditioned as needed to satisfy the MMPDS system components. AC main power is converted into high and low DC voltages for proper operation of various electronic components in the MMPDS system. Low voltages (LV) take standard values and tolerances to operate analog and digital circuitry. High voltage (HV) is used to bias the drift tubes for operation, and is tightly regulated for stable operation. In this document, various aspects of the detector electronics 300 are described.

Figure 2:
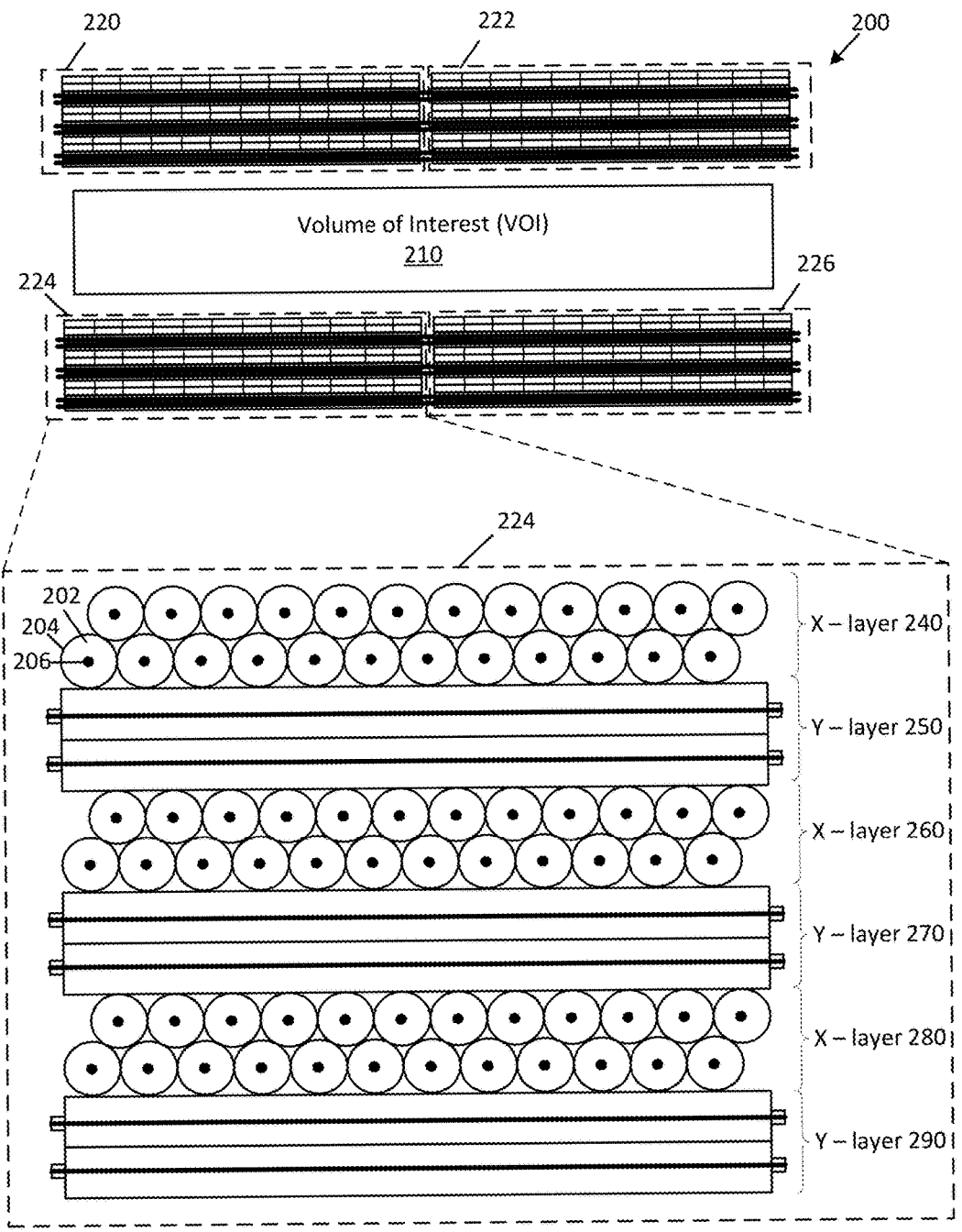
FIG. 2 is a block diagram of an exemplary MMPDS detector assembly.

FIG. 2 is an exemplary detector assembly 200 for detecting cosmic ray charged particles traversing a VOI. As briefly described above, the detector assembly 200 strategically arranged around a VOI 210 (e.g., top and bottom of the VOI) detects and tracks cosmic ray charged particles traversing through the VOI 210. The detector assembly 200 is made up of multiple drift tube arrays designed to allow investigation of the scanned VOI 210. A drift tube 202 is a sealed ionization chamber with a coaxial transmission line filled with a mixture of low-pressure gases. The sealed ionization chamber of a drift tube 202 can be implemented as a hollow cylinder (e.g., 2 inch-diameter aluminum tubes) that is filled with gas and sealed. The aluminum wall of the drift tube acts as a cathode 204. A conductive material, such as a fine gold plated tungsten-rhenium wire element is strung down the long axis of the tube to act as an anode 206. The drift tube 202 produces electrical signals in response to ionization radiation that passes into or through its volume. The drift tube 202 combines three functions into a single device: sensing, timing and gain.

The gas in the drift tube is ionized by incidence of muons that creates electron-ion pairs. For gamma rays, electrons are produced when the gamma ray is incident on the aluminum shell of the drift tube that then ionizes the gas in the drift tube. Since a high-potential difference is maintained between the anode and the cathode (e.g., nominally 2.9 kV), the electrons thus created drift towards the anode and collide with other molecules along the way, with the positively charged ions moving towards the cathode. The movements of electrons in the electric field produce a measureable current on the anode wire. Then the electrons recombine at the wire. The time that elapses between the muon incidence on the drift tube and the measured signal in the anode wire is known as the drift time. The farther the muon trajectory is from the anode, the longer the drift time. The gas itself can include a mixture of helium ($^4$He), ethane, tetrafluoromethane, and argon, chosen to ensure performance and to sustain the large electrical fields inside the drift tube without breakdown.

In order to inspect a large volume, the drift tubes 202 in the detector assembly 200 can be arranged to operate as pairs with each pair representing a signal channel. The total number of signal channels for the detector assembly 200 can vary based on the number of drift tubes 202, for example. The drift tubes 202 can be arranged together into one or more groupings based on the configurations of the drift tubes 202 desired for the detector assembly 200.

On the bottom of FIG. 2 is an exploded view of a grouping of drift tubes 224 showing a collection of modules arrayed in six layers 240, 250, 260, 270, 280 and 290, alternating between X-facing (e.g., 24-ft) and Y-facing (e.g., 36-ft) modules. While the exploded view is shown for one grouping of drift tubes 224, each of the drift tube groupings can be arranged in substantially similar manner. As described above and shown in FIG. 2, the grouping of drift tubes 220, 222, 224 and 226 are arranged to have one grouping of drift tubes (or two groupings of drift tubes arrayed end to end) suspended above the VOI 210 and one grouping of drift tubes (or two grouping of drift tubes arrayed end to end) suspended below the VOI 210 to track cosmic ray charged particles that pass through the VOI 210.

Figure 3:
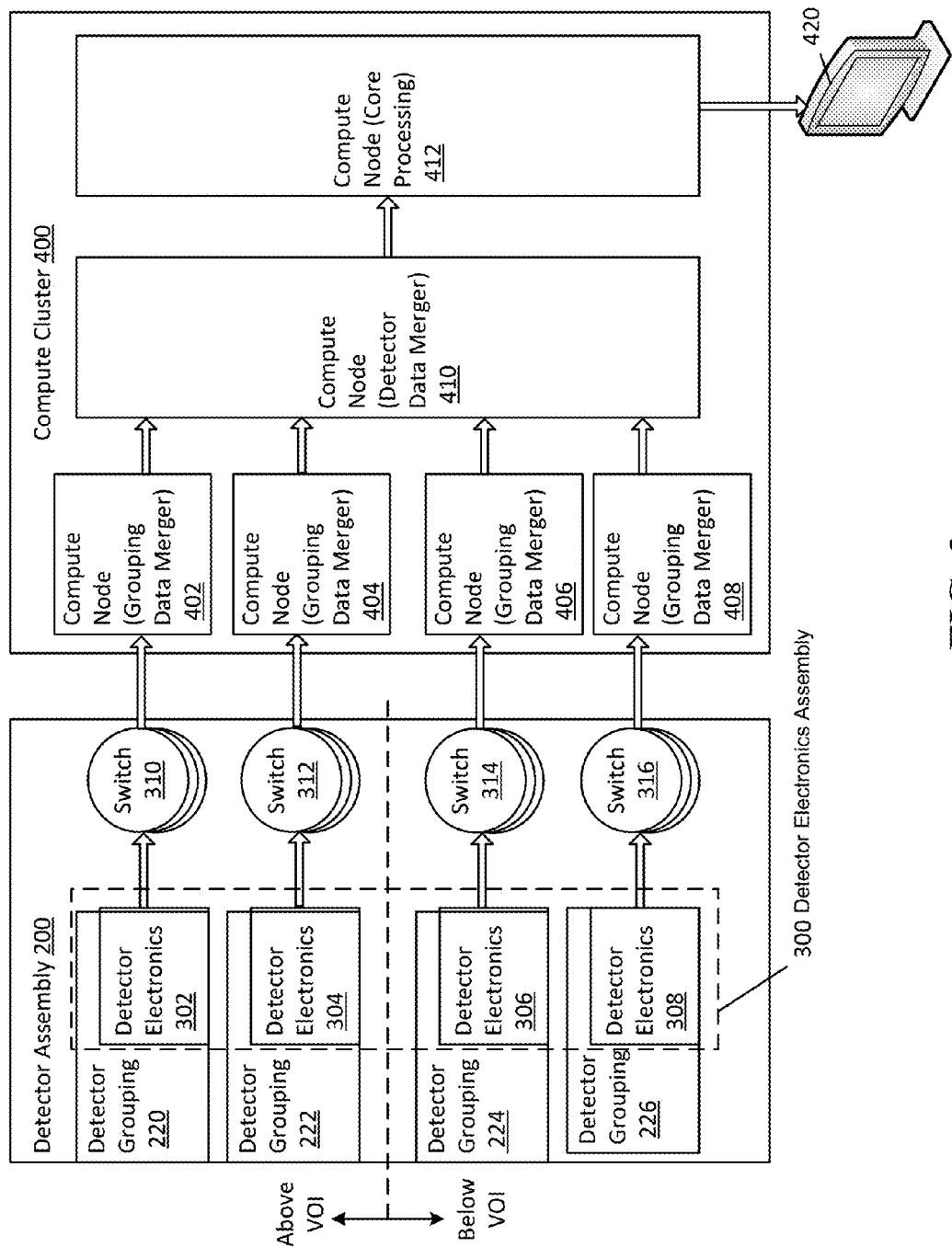
FIG. 3 provides an exemplary data flow of MMPDS.

FIG. 3 is a block diagram showing an exemplary data flow from a grouping of drift tubes to a workstation. Each grouping of drift tubes (e.g., 220, 222, 224 and 226) in the detector assembly 200 is communicatively linked to an individual detector electronics 302, 304, 306 and 308 within the detector electronics assembly 300 to transmit the signals from the sensory arrays in the grouping of drift tubes to a compute cluster 400. A separate detector electronics assembly can be associated with each grouping of drift tubes or one or more detector electronics assembly can communicate with multiple grouping of drift tubes. To transmit the sensor signals from the grouping of drift tubes, one or more switches (e.g., 310, 312, 314 and 316) can be implemented to link with the compute cluster 400. Individual sensor signals from the detector electronics assemblies 302, 304, 306 and 308 can be processed by separate grouping of drift tubes compute nodes 402, 404, 406 and 408 within the compute cluster 400 to merge data for each grouping of drift tubes. A detector compute node 410 within the compute cluster 400 can communicate with the individual grouping of drift tubes compute nodes 402, 404, 406 and 408 to merge all data from all grouping of drift tubes. A core compute node 412 within the compute cluster 400 can communicate with the detector compute node 410 to process the merged detector data. An operator working at a workstation (e.g., 420) can access, view and process the data from the core compute node 412.

The detector electronics (e.g., 302, 304, 306 and 308) of the detector electronics assembly 300 can include conditioning electronics or circuitry for conditioning signals from the groupings of drift tubes. The groupings of drift tubes can interface with a common signal conditioning electronics or circuitry. In some implementations, each grouping of drift tubes can be associated with a separate respective conditioning circuitry or electronics to condition drift tube detector signals that includes high voltage and low voltage (HV/LV) signals received from drift tubes of the corresponding grouping of drift tubes, detect pulses corresponding to passage of a cosmic ray based particle through the corresponding grouping of drift tubes, and convert the detected pulses to a digital signal that are timed according to a system-wide synchronized clock. For implementations integrating the individual detector electronics 302, 304, 306 and 308 into a single detector electronics assembly, a single conditioning circuitry or electronics may be used.

Each drift tube detector module can be operated from the conditioning electronics or circuitry that can include a set of analog and digital electronics to perform various tasks including the following:

(1) Electrically bias the drift tube sensors in their optimal operating range;

(2) Convert signal pulses received from the drift tubes into digital, time-tagged pulses; and (3) Transmit the converted time-tagged pulses to system servers for subsequent processing and analysis.

The conditioning circuitry or electronics can include a high voltage (HV) supply to bias the drift tube and circuitry to process drift tube signals. The HV supply can be designed (e.g., based on a Spellman high-voltage power supply module) to allow high precision monitoring of the output voltage and current. The HV supply can be either electronically or manually controlled and can include digital on/off, high current mode (e.g., in manual operation), local on/off, current and voltage control using digital-to-analog converters (DAC), for example.

Also, the conditioning circuitry or electronics can include a high voltage distribution circuitry that operates as a high voltage splitter that takes a high voltage bias input from the main supply and splits the high voltage bias input into multiple outputs for use in separate detector layers. In the calibration process, each drift tube can be operated at its own optimal bias, which can be different from tube to tube. For example, the high voltage distribution circuitry can split the high voltage bias input from the main supply into two layer-compatible outputs. In some implementations, each grouping of drift tubes can have a total of three X-layers, three Y-layers, and three high voltage power supplies. Each power supply can serve one X-layer and one Y-layer, for a total of 30 modules in some implementations.

The circuitry to process drift tube signals can include electronics and/or circuitry for interfacing the drift tubes with signal processing or measuring electronics or circuitry. For example, the circuitry to process drift tube signals can include interface circuitry including physical or wireless connections (e.g., an interface board) to interface with and obtain the detector signals from the drift tubes directly. The interface circuitry can be physically mounted to the drift tubes and manage the communication medium, such as cabling, between drift tubes and remainder of the electronics of the conditioning electronics or circuitry. The interface circuitry can include passive circuitry to filter out the large DC HV bias used for drift tube operation and passes (e.g., using AC coupling) the resulting, small (LV) current signals can be amplified by an amplifier circuitry. Also, the interface circuitry can provide a bus distribution point for the high voltage bias. The interface circuitry can be in communication with circuitry or electronics to detect and amplify the signals from the interface circuitry. In addition, circuitry to perform signal conversion, such as time to digital converters can be included in the circuitry to process drift tube signals.

The circuitry to detect and amplify the detector signals can include measurement circuitry that measures the current induced in the drift tube detectors. For example, the circuitry to detect and amplify the detector signals can convert and amplify the low-level current signals (e.g., tube pulses) from the drift tubes (e.g., arriving via the interface circuitry) into detectable low voltage differential signals and compare these signals with predetermined, set threshold values. Whenever the detected signal is compared against the threshold (e.g., crosses the threshold), the circuitry to detect and amplify the detector signals can transmit a corresponding digital pulse (e.g., low voltage digital asynchronous pulses) to the time to digital converter to indicate how the signal compares against the threshold values (e.g., higher, lower or met the threshold). The amplified signal from the drift tube signal channel can be sampled and processed to determine whether the sampled signal satisfied one or more predetermined thresholds. The circuitry to detect and amplify the detector signals can also provide onboard circuitry for a Built-In Self-Test (BIST) (not shown), as well as the ability to control threshold levels used to process the sampled signal. The BIST circuitry can verify the entire signal chain (e.g., by simulating a tube pulse on the front end of each amplifier) and use one or more discrete digital-to-analog (D/A) channels for each amplifier channel.

The time to digital converter can convert a signal of relatively infrequent pulses into a digital time representation. The time to digital converter can use a processing unit such as a Field Programmable Gate Array (FPGA) to perform its function. The time to digital converter can output the absolute time of arrival and length of each pulse received. The time to digital converter may not generate pulse amplitude data in some implementations. In such case, a comparator can be used prior to each channel input. The time to digital converter can handle basic functions (e.g., time-to-digital conversion function) as well as buffering, packaging and transmitting the collected drift tube signal data (e.g., hit packets) to the analysis stream, such as an analysis system shown as compute cluster 400. In addition to its time-to-digital function, the FPGA of the time to digital converter can also instantiate an embedded computing platform to manage data transfer, configure the time to digital converter and peripheral hardware, and monitor the conditioning electronics or circuitry for faults. The time to digital converter can include volatile dynamic random access memory units such as Double Data Rate 2 (DDR2) memory, non-volatile flash memory for firmware and program storage, a high-speed Ethernet port, a clock synchronization interface, and multiple connection points to interface with the mezzanine device (computer servers) and external equipment. The time to digital converter can also control the HV supply using a HV control signal to each drift tube channel, ensuring that its bias is set to defined values for optimal operation.

One or more low voltage supplies (LVS) (not shown) can be included in the conditioning electronics or circuitry to provide power to the time to digital converter and the circuitry to detect and amplify the detector signals.

Referring back to FIG. 3, compute cluster 400 can include multiple compute nodes (e.g., computers) for merging individual grouping of drift tubes data (e.g., 402, 404, 406, 408), compute nodes (e.g., computers) for merging all grouping of drift tubes in the detector and compute nodes for processing the merged detector data. The compute nodes in the cluster 400 can operate in combination to contain and execute the MMPDS data processing and analysis software. While CEP 320 includes firmware and a software kernel (e.g., Linux kernel), the system software for MMPDS is located in the compute nodes. The software in the detector electronics assembly can be an embedded application that is responsible for sending measured current pulses to the compute nodes.

Each detector electronics assembly (e.g., 200) merges signals from 24 drift tube channels into a single pulse train.

Referring back to FIGS. 1 and 3, the user interface 500 can be implemented as a graphical user interface (GUI). The GUI 500 allows a qualified operator, maintainer and installer to perform various respective functions. The operator functions of the GUI 500 can include at least the following:

Starting or stopping a scan.

Seeing the display of a scan in progress.

Obtaining an automatic clear or alarm output.

Seeing the display of 3D scans with detected materials and gamma sources.

Seeing a system status indicator display, providing a clear representation of system health.

The maintainer functions available on the GUI 500 can include allowing the maintainer access to all operator functions as well as to perform system monitoring and general diagnostics.

The installer functions available on the GUI 500 can include allowing the installer to access all operator functions as well as functions for initial installation of the system.

Clock Signal Distribution and Synchronization for Additional Sensors

In addition, to ensure that the high-accuracy timing requirements are satisfied, MMPDS system 100 includes Accurate Clock Synchronization (ACS) implemented across the system to ensure that the high-accuracy timing requirements are satisfied. In implementing the ACS, clocks are synchronized to within a predetermined time in order to enable identification of particle tracks through the detector array in the detection system 200 by pairing incident and emergent particles correctly. Synchronized clock distribution can be implemented using a clock tree scheme with a network of signal distribution equipment linked to provide circuitry to detect and amplify the detector signals with aligned clock and signal edges meeting the timing precision requirement.

An exemplary clock system for MMPDS 100 can take a single-source (i.e., original or master) clock/synchronization from a master circuitry to detect and amplify the detector signals and distribute the single source clock/synchronization to all circuitry to detect and amplify the detector signals in the MMPDS. Multiple splits of the source signal can be used to deliver a single source to multiple devices in a distribution system of multiple synchronizations devices. For example, multiple splits of the original signal can be used to deliver a single source clock/synchronization to multiple devices in a distribution tree. The original or master clock source is obtained by circuitry in the first level, and each subsequent level can buffer the original or master clock source signal for distribution to the upper and lower grouping of drift tubes. Careful design and choice of matched components, including matched cable lengths, can ensure that each parallel path results in minimum time differences (e.g., no larger than a minimum amount of time acceptable) at each conditioning electronics or circuitry.

Incorporation of Auxiliary Detectors to Enhance Detection System

In some implementations, additional detectors, such as spectroscopically resolving detectors can be incorporated into the detection system to perform spectroscopic characterization of gamma rays emitted by any radioactive material inside the VOI. For example, spectroscopic gamma ray detectors can be incorporated into the detection system to enable identification of the nuclei undergoing radioactive decay, including natural or stimulated fission, within the VOI. The disclosed technology thus enables mobile implementations of a smaller MMPDS-style array—one that might not always be used for 3-D imaging, for example—augmented with the auxiliary sensors, such as the spectroscopically resolving detectors.

In some implementations, neutron detectors and other auxiliary detectors can be incorporated into the detection system to enhance the MMPDS. For example, neutron detectors (e.g., $^3$He and scintillation) can be incorporated into the detection system to detect and discriminate low-enriched uranium (LEU) via muon-induced fission. When muons interface are stopped by a fissionable material in the VOI, the stopped muons get an orbit and cascade down. The muons are captured by the nucleus of the fissionable material, and combine with a proton to form a neutron with increasingly higher probability for a high Z material. Nuclear in excited state, goes to main state to emit gammas with higher multiplicities for fissionable materials. Secondary fissions occur in chain reactions for fissile materials.

Muon-induced fission can be used to identify special nuclear materials (SNM). More muons stop in high-density (i.e., high-Z) materials. Also, muonic x-rays have a higher energy, and thus more penetrating for high-Z materials. In high-Z materials, fissions are more likely, and the resulting fission products are more numerous. Moreover, chain reactions are more likely in fissile materials, not just a single event.

In addition to the drift tubes that detect and track cosmic ray charged particle (e.g., muon) trajectories within a VOI, gamma and neutron detectors can be incorporated into the detection system to measure muon-induced fission radiation produced by the muons stopped in the fissile material. The gamma and neutron detectors can count the resulting fission gammas and neutrons. The detection signals from the particle trackers, gamma detectors, and the neutron detectors can be incorporated into the same data stream to obtain all detector signals together for enhanced detection of SNM. For example, the detection signals from the auxiliary detectors (e.g., gamma and neutron detectors) can be parsed identically to the MMPDS particle tracking sensors, so that all detector signals arriving from spatially separate sets of input channels can be merged into time slices that contain all signals from the entire array of all detectors (i.e., Data Merger). At that point, data from the additional auxiliary sensors are available for concurrent processing along with charged particle tracking data.

The described technology can include a combination of the open architecture and the modified data acquisition software architecture that accommodate incorporation of a larger number of coincident auxiliary detectors with the charged particle trackers to enable operation in a high-radiation background environment, such as might be found near a nuclear power plant reactor following rupture of the containment vessel. In addition, the added auxiliary detectors can be incorporated into the detection system without having to modify the detection system's electronic and data acquisition architecture. The open architecture allows the MMPDS to be augmented by detectors of both fast and slow neutrons.

Modifications to Data Acquisition Software Allowing it to Accommodate a Larger Number of Coincident Detections, thus Enabling Operation in High-Background-Radiation Environments.

In addition to providing an open architecture for incorporating additional detectors to the MMPDS, a new analog to digital conversion board design can provide wave-form digitization of pulses and delivery of the digitized data from the drift tubes for concurrent analysis with data from other sensors, such as the neutron sensors. The new analog to digital conversion board as described in this paper allows the analysis of signal shape, which can be used to determine energy deposition in spectroscopic gamma detectors and discriminate neutron from gamma hits in other types of detectors, such as $^{10}$Boron-based slow-neutron detectors. Spectroscopic detection enables identification of the atomic species undergoing radioactive decay or muon-induced fission in the VOI, thus providing greater material characterization of the VOI contents and making up for the lack of a 3-D image in certain configurations or operational scenarios. In some implementations, the same spectroscopic detection modalities can also be added to a MMPDS to provide both 3-D imaging and improved material identification.

Analog to Digital Conversion Board Providing Wave-Form Digitization of Pulses and Delivery of Sensor Data for Concurrent Analysis of all Sensor Data In addition to the existing MMPDS hardware, the disclosed technology provides for an analog to digital conversion board that provides wave-form digitization of pulses and delivery of the data for concurrent analysis with data from other sensors. The analog to digital conversion board as described according to the disclosed technology allows the analysis of signal shape, which can be used to determine energy deposition in spectroscopic gamma detectors and discriminate neutron from gamma hits in other types of detectors, such as $^{10}$Boron-based slow-neutron detectors. Spectroscopic detection enables identification of the atomic species undergoing radioactive decay or muon-induced fission in the VOI, thus providing greater material characterization of the VOI contents and making up for the lack of a 3-D image in certain configurations or operational scenarios. In some implementations, the same spectroscopic detection modalities can also be added to a MMPDS to provide both 3-D imaging and improved material identification.

MMPDS Data Processing Architecture: Data Processing Modules

Figures 1, 4A:
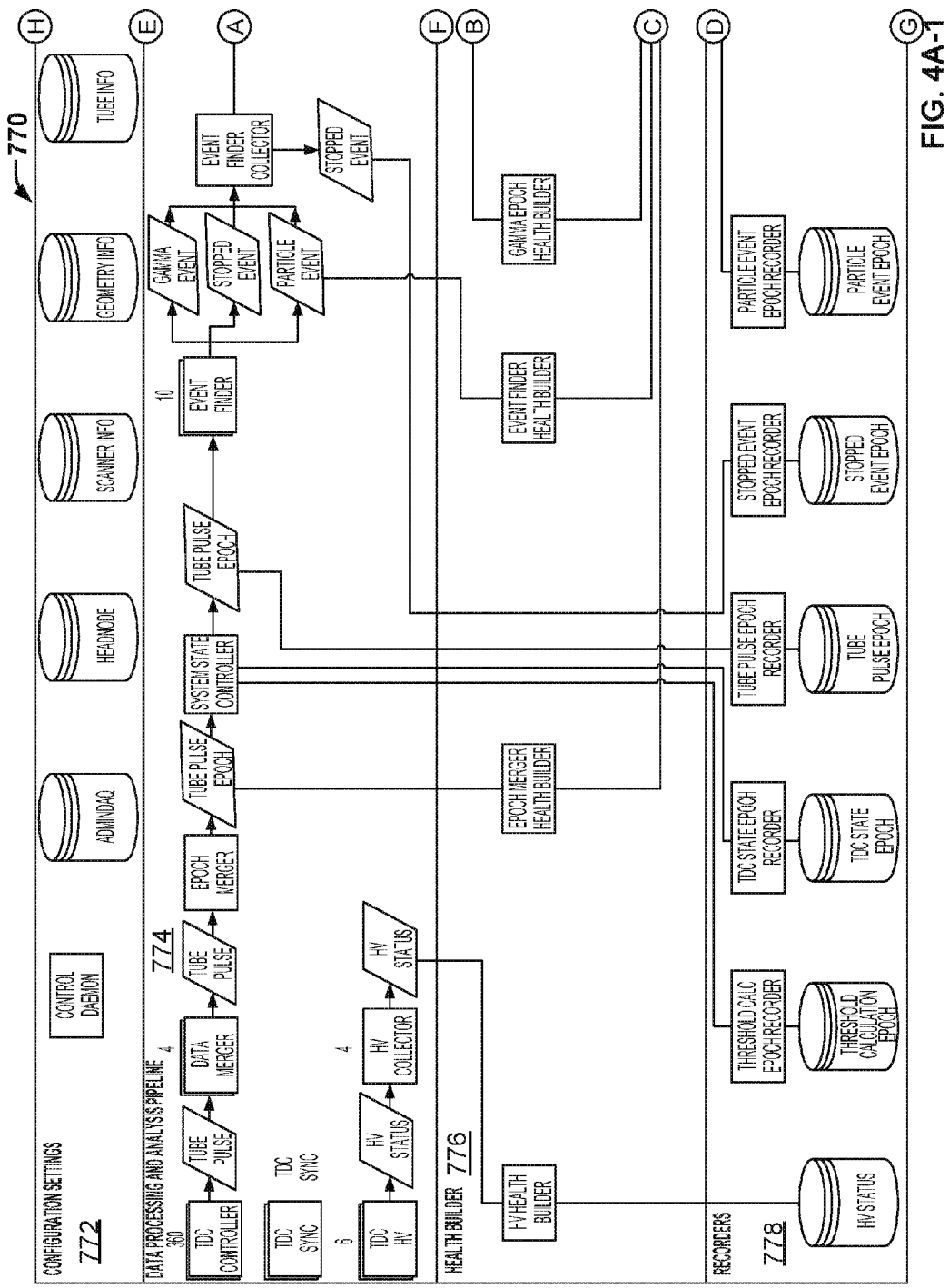
FIG. 4A is a data flow chart showing an exemplary MMPDS Data Processing Architecture.
Figures 2, 4A:
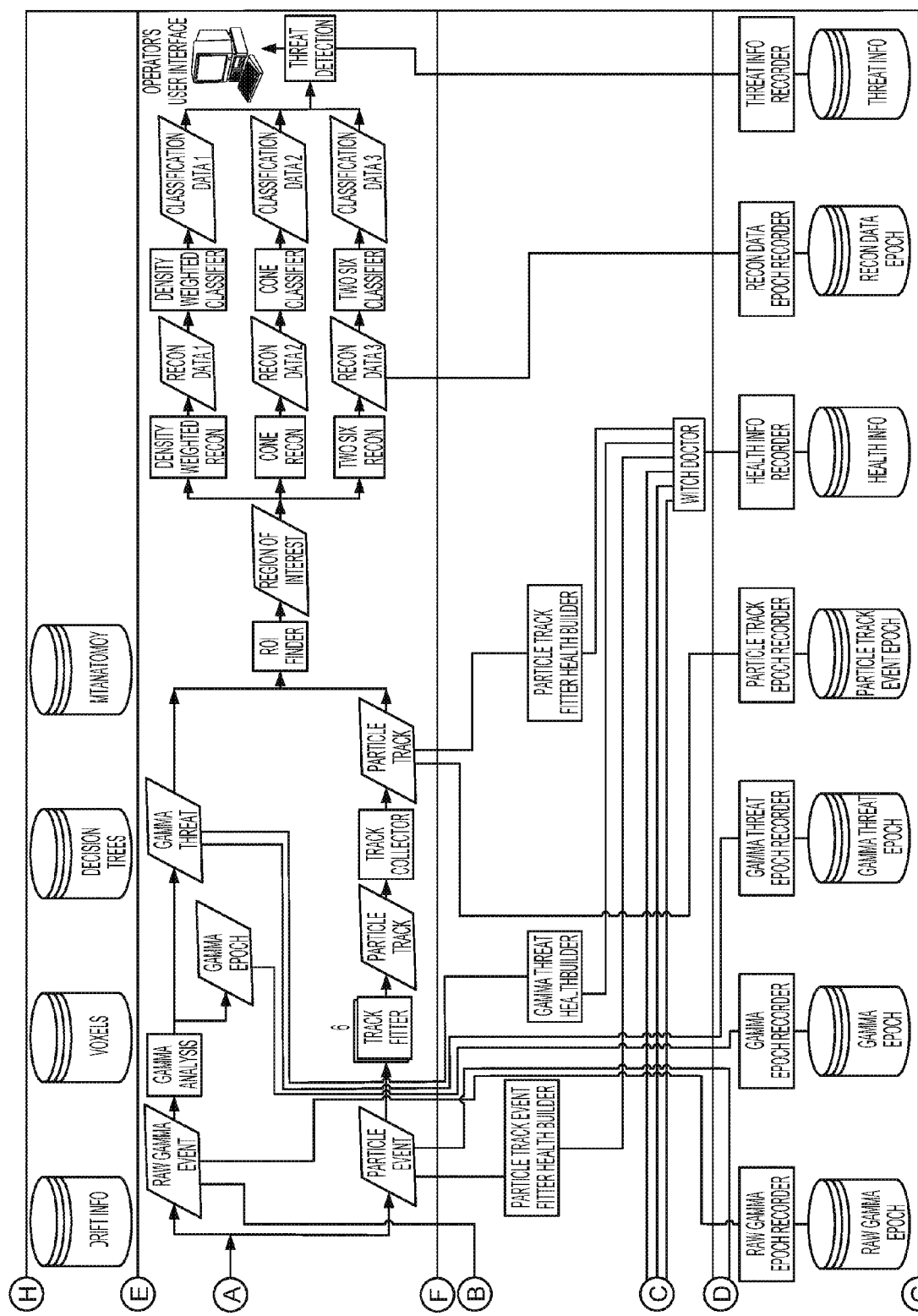

FIG. 4A is a data flow chart showing an exemplary MMPDS Data Processing Architecture 770. The described MMPDS Data Processing Architecture 770 can include exemplary data flow and processes for determining the temporally collated data, identify individual charged particle tracks entering and leaving the detector array, and pairing incident and exiting tracks to measure the effective scattering location and scattering angle. The collection of effective scattering locations and angles is used to reconstruct a tomographic image of the density and the atomic number Z (of the atoms in the VOI) distribution within the VOI. The distribution information is analyzed and characterized to define potential threat regions whose properties correspond to, for example, special nuclear materials.

In addition, the described MMPDS Data Processing Architecture 770 includes data flows to enable state control, system health monitoring, and data recording processes to operate in parallel with the detection, track and event identification, and volume reconstruction processes outlined above. These processes in combination enable a robust, reliable, and cost-effective system for imaging and detection of threats using natural, ambient cosmic rays.

At the coarsest scale, the data flow chart in FIG. 4A shows signals organized into four categories or streams. The data category or stream at the top 772 can include system control settings that set operating parameters (e.g., number of sensor modules and groups of detector modules in the system, drift tube voltage settings, and so on). The data category or stream at the bottom 778 can include data recorders that record system operating parameters and signals at different stages of processing. The data categories or streams in the two center bands 774 and 776 can include functional flow of signals and data. The data category or stream at the upper central band 774 can include a flow of signals in system operation, from raw drift tube output voltages at the extreme left to ultimately processed images and resulting clear/alarm designations at the extreme right. The data category or stream at the lower central band 776 can include various "Health Builders" modules that receive various system signal levels and compare them to predetermined thresholds to determine whether the system is functioning properly. When the system is determined to be not functioning properly, the Health Builders modules can identify components that are malfunctioning based on the comparison of the system signal levels against the predetermined threshold values. The described MMPDS Data Processing Architecture 770 can be organized into control, operation, health monitoring, and recording characteristics, corresponding to the four bands of the flowchart. The discussion that follows focuses on the upper central band, system operation 774.

Detection of charged particles by the drift tube sensors in the sensory array correspond to voltage pulses generated in the drift tube sensors in response to charged particles entering the sensors. As described above, the TDC boards convert these voltage pulses from individual drift tube sensors of individual SMs to digital signals corresponding to the area under the pulse and the time of the pulse, time-stamped with a precision (e.g., of 2 ns) with respect to a common clock signal distributed throughout the sensor array, using the TDC Sync board to ensure that the clock time is identical at each TDC. Since muons travel near the speed of light and traverse the sensor array in a transit time of 15-25 ns, it is important that detections be synchronized accurately.

Data Merger and Epoch Merger processes are two important aspects of the MMPDS Data Processing Architecture 770 that enable tomographic imaging using the random shower of charged particles, such as muons. To perform tomographic imaging using the random shower of charged particles, such as muons, the Data Merger obtains a substantially continuous recording of charged particle detection data in parallel streams from all of the detectors. The Data Merger segregates the obtained data in parallel streams by detector location in the array. The Data Merger combines the spatially segregated data streams from all detectors in the array into a time-synchronous detection stream. The Epoch Merger parses the time-synchronous detection stream into epochs of predetermined durations (e.g., one-second-long epochs) that bin detections from all the detectors in the array within that time span. The epochs are parsed in sliding windows of a predetermined width (e.g., 500 ns). The detection signals from the entire detector array are collated simultaneously or substantially simultaneously in order to parse them into tracks of individual particles. FIG. 4B is a process flow diagram graphically showing an exemplary Data Merger process 780 for converting parallel time streams, already merged into epochs from each grouping of drift tubes, into sequential epoch records. In FIG. 4B, the merger process changes parallel time streams (in the figure, already merged into epochs from each Super Module (SM0, SMX) into sequential epoch records. The event merger provides each of the merged epochs (0 through X) to the event finders (1 through X) for determination as to when an event (a particle or gamma source) has occurred. An exemplary process for merging spatially separated streams of detector signals into temporally separated time slices is described in a later section of this document.

The System State Controller determines the status of each process in the system. With respect to epochs, the State System Controller determines whether the data are complete or not. Based on the determination of complete or incomplete data, the State System Controller identifies epochs as "good" or "bad", and enables or disables subsequent processing, respectively.

The Data Merger receives data from the detectors, reads the time stamp, and determines whether a corresponding epoch already exists. When determined that a corresponding epoch already exits, the Data Merger appends the data to that epoch. When a corresponding epoch does not exist, the Data Merger creates a new epoch for an active list of epochs. Good epochs are sent on for further processing as outlined below. Bad epochs are deleted from the list. Epochs remain in the Data Merger for a period of time to collect all the data from the array. In some implementations, an epoch that remains for more than a predetermined duration (e.g., 4 seconds) is declared "stale" and is removed from the active list. The time duration for declaring a stale epoch can be set to any particular value of time. Table 1 below illustrates a situation where epoch 296 at time 10000 has gone stale for lack of data from source number 3, while the succeeding epochs are identified as being good.

TABLE 1

An exemplary failure scenario with a stale epoch
System Time = 100005
Stale Time = 4 seconds

| Epoch Number | Time | DAQ Source 1 | DAQ Source 2 | DAQ Source 3 | DAQ Source 4 |
|---|---|---|---|---|---|
| 300 | 10004 | Good | Good | Good | Good |
| 299 | 10003 | Good | Good | Good | Good |
| 298 | 10002 | Good | Good | Good | Good |
| 297 | 10001 | Good | Good | Good | Good |
| 296 | 10000 | Bad | Bad | Bad (lack of data) | Bad |

Good epochs are sent to the Event Finder process to identify usable particle tracks. The MMPDS can set criteria for define different types of events including: (1) a muon transiting the detector, (2) a muon stopped (absorbed) within the volume of interest (VOI), and (3) a gamma ray emitted by radioactive material within the VOI.

Once tracks are collected, an ROI Finder process evaluates regions within the VOI likely to contain potential scattering bodies and/or gamma ray sources. Image Reconstruction algorithms use the tracks, constrained by the ROI Finder, to reconstruct an image of the density of material within the VOI. Finally, a material of interest detection algorithm evaluates the image and ROI Finder data to declare the presence or absence of a material of interest, automatically. The image is also available to a human operator for interpretation.

Described in this document are the overall MMPDS data flow architecture and the importance of collating all events recorded by the entire detector array within a narrow time window, in order to extract the likely particle trajectories needed to reconstruct the atomic number, density, and possible radioactivity of materials distributed within the VOI.

The described data processing architecture and individual processes within that architecture can be modified to include various refinements. Exemplary refinements can include, for example, use of different criteria for accepting or rejecting a given particle detection as part of a valid track; substitution of different algorithms to determine the most likely effective location of a scattering event, and its angle; the substitution of different image reconstruction algorithms at the reconstruction step; and use of different algorithms to identify regions of interest within the VOI. In some implementations, multiple algorithms may be used in parallel to accomplish any task in the data flow, and their multiple outputs may be combined to improve the likelihood of obtaining a more accurate image or threat assessment. Described below are only a few illustrative embodiments and examples of data categories or streams of the MMPDS data processing architecture including Data Processing Modules, Health Monitoring Modules and Data Recording Modules. Each of the exemplary data categories or streams is further described to include respective process modules.

MMPDS Data Processing Architecture: Data Processing Modules

Data is captured from the TDC electronics in a continuous stream. The initial acquisition is performed by hundreds of discrete collection points. In some implementations, over 360 discrete collection points are used to perform the initial acquisition. Therefore, large amounts of data are concurrently being sent in parallel streams to multiple data mergers. At that point, the data are spatially segregated.

Figure 5:
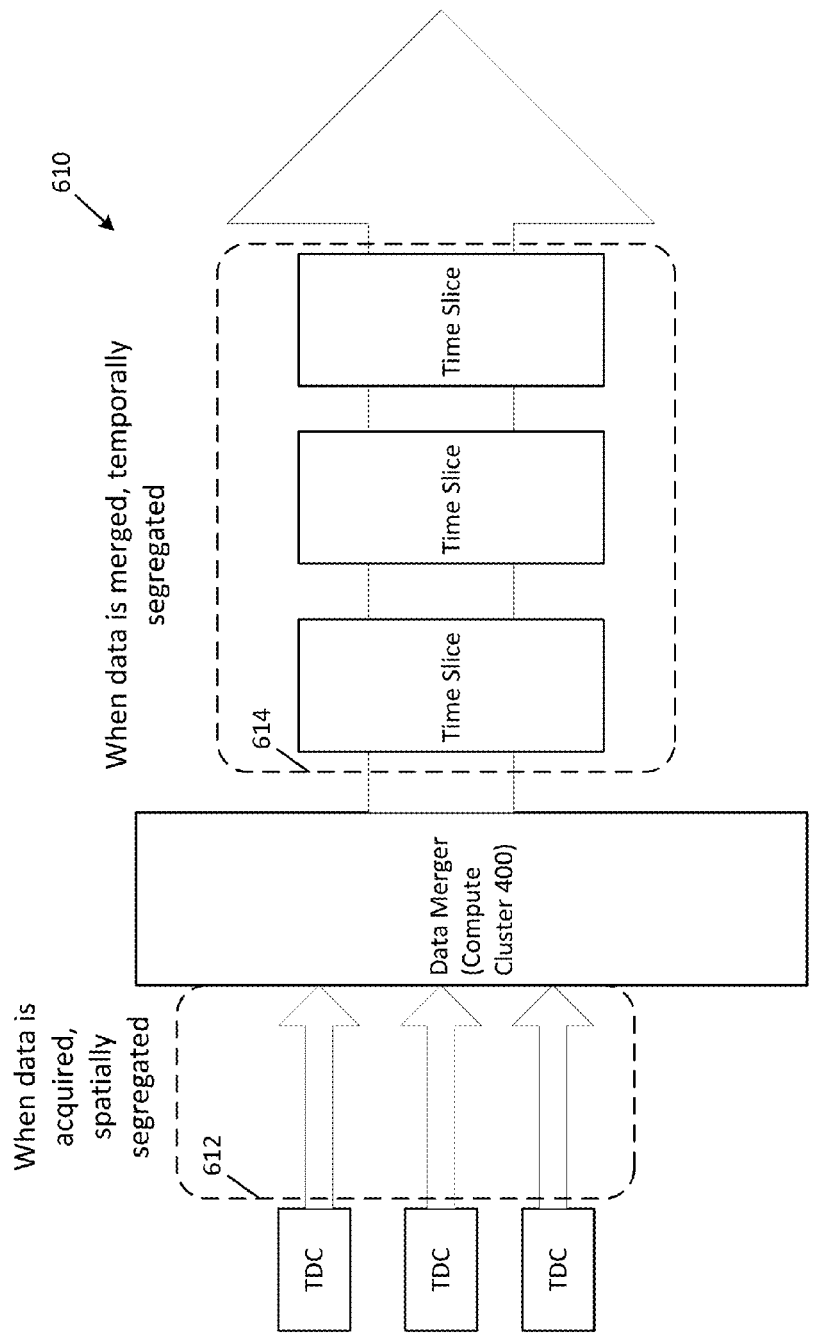
FIG. 5 is a data flow diagram showing an exemplary data merger into time slices.

The data are geometrically split into multiple streams (different streams represent different detector modules). To perform event finding and track fitting, data from all geometric locations of the detector are available simultaneously. To accomplish this, all TDC data are collated, time-stamped, time-sorted, and divided into discrete time increments as shown in FIG. 5. FIG. 5 is a block diagram showing an exemplary data flow 610 for merging drift tube detector data from individual TDC into time slices. Acquired drift tube detector data are spatially segregated (see 612) while the merged data is temporally segregated (see 614). Thus, instead of analyzing a segment of data collected from a section of the MMPDS, the analysis is performed on a detector-wide time-slice of data. The time-slices of data are processed to find and track both muons and gamma rays. This information is processed and combined to reconstruct the image of the scanned volume and identify any regions potentially containing a material of interest. The results are communicated to the operator through a user interface (e.g., user interface 500). Also, the system is continually monitored for satisfactory performance with data being recorded and system performance being logged.

Figure 6:
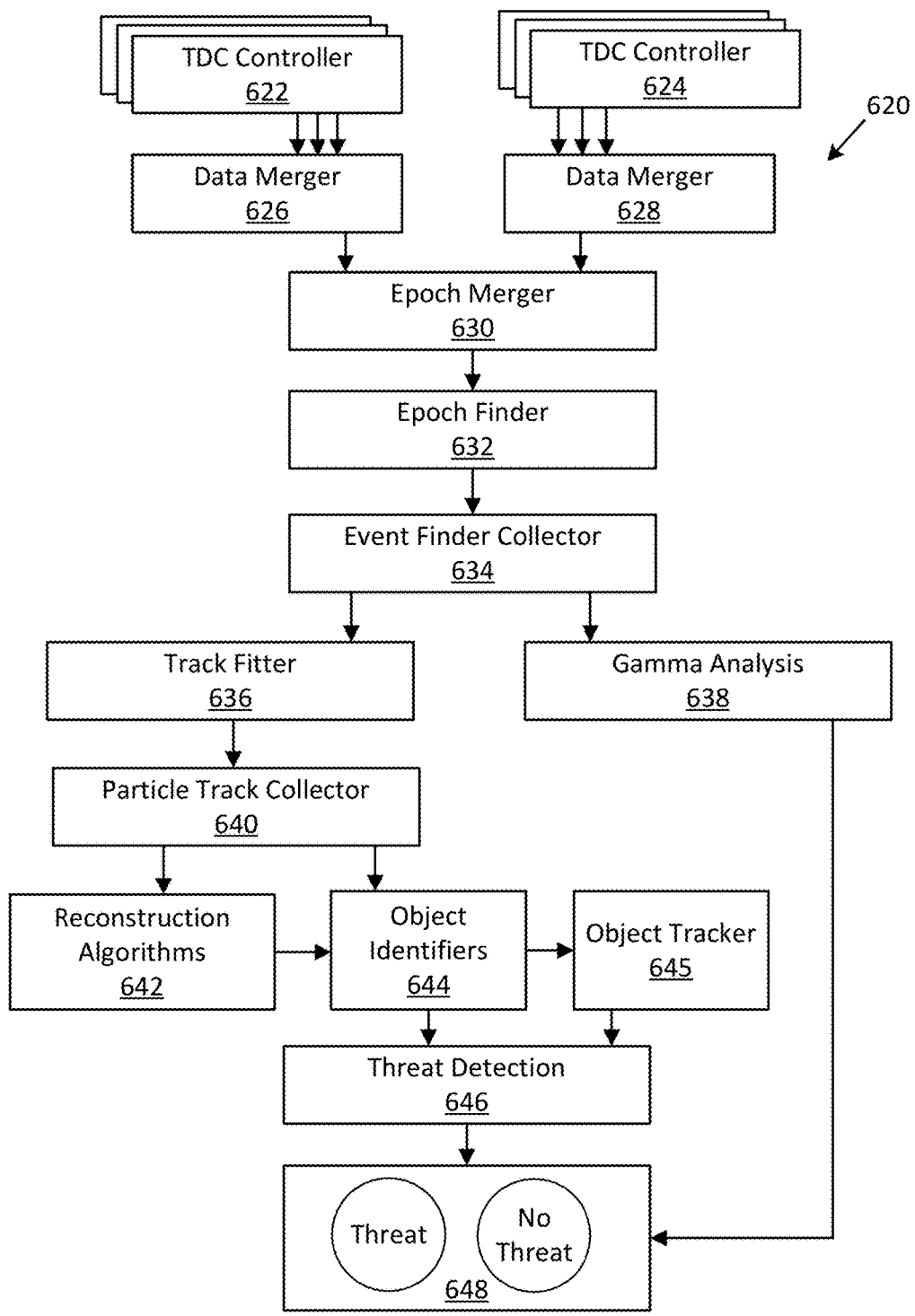
FIG. 6 is a process flow diagram showing an exemplary process for data process and analysis.

FIG. 6 is a data flow diagram showing an exemplary process module 620 for data processing and analysis. The data processing and analysis modules 620 includes TDC controller process modules 622 and 624 to capture time-stamp tube pulses from the TDC circuitry in a continuous stream. Each TDC is verified to be synchronized, for example at a one pulse per second (PPS) rate, ±20 ns of the mean synchronization. The TDC controller process module can operate in a continuous data collection fashion. The samples collected for each of the tubes connected to the TDC can be collected over a one second interval. At each one second boundary, identified as an epoch, the TDC controller process module can output the full report of hits to the Data Merger 626 and 628. The TDC controller process modules 622 and 624 can interface to the TDC over a TCP/IP interface. Each TDC can be assigned a unique TCP/IP address. The TDC controller process modules 622 and 624 can perform auto thresholding. Auto thresholding can make adjustments for tubes that have statistically high or statistically low hits by appropriately changing threshold level at which a tube pulse hit is detected. The TDC can send a minimum of tube hit rates, high voltage status, and synch status for performance monitoring purposes.

A separate data merger processing module (626, 628) is assigned to each grouping of drift tubes to collect tube pulse hit signals received from the TDC controller and merge the collected tube pulse hit signals together to create discrete time increments (epochs) of hits. The MMPDS system can provide a single Data Merger for each sensor module or a group of sensor modules. Each Data Merger collates, sorts by time, and divides the data into discrete epochs within a single epoch window.

Epoch merger module 630 merges the hit epochs from the Data Mergers to create detector wide hit epochs. The MMPDS system can provide a single Epoch Merger. The Epoch Merger can collate the epochs from the Data Mergers to create detector-wide epochs.

The tube pulse event finder module 632 determines when an event (a particle or gamma source) has occurred. The tube pulse event finder module can identify three types of events in sliding windows of time: Particle Events (hits indicated a particle (muon or electron) passed through the detector), Stopped Particle Events (hits indicating a particle stopped within the detector), and Gamma Events (hits indicating a gamma source). The sliding window can be 500 ns, for example. The tube pulse event finder 632 can distinguish between the three types of events based on multiplicity of hits.

The event finder collector module 634 collects the charged particle events identified by the event finder 632.

Track fitter module 636 determines the trajectories of the charged particles, for example muon trajectories. The track fitter 636 uses the particle epochs provided by the Event Finder 632 and, using a track fitting algorithm, determine the muon trajectories. The Track Fitter 636 can develop tracks for the top sensor module or a group of sensor modules as well as the bottom sensor module or a group of sensor modules.

The particle track collector 640 receives the particle trajectory data as calculated by the track filter module 636.

The reconstruction algorithms process module 642 creates a three-dimensional density map of the scan volume. The reconstruction algorithms process module 642 can contain one or more processing algorithms to ensure that the required probability of detection or performance requirements is met. Multiple reconstruction algorithms process modules 642 can be implemented to perform different reconstruction algorithms in parallel. The object identifier module(s) 644 use the information obtained from the reconstruction algorithms process module 642 and particle track collector 640 to identify the object according to particular algorithm(s). The information obtained from the object identifier module 644 is provided to the object tracker module 645. The threat detection module 646 uses the information obtained from the object identifier module 644 and object tracker module 645 to identify and detect the particular threat. The output of the threat detection module 646 and the information obtained from the gamma analysis module 638 can be used at 648 to identify whether or not a threat exists.

MMPDS Data Processing Architecture: Health Monitoring Modules

The MMPDS system 100 can include a Health Monitoring capability to enable maintenance to ascertain the status of the system. Health monitoring can include measuring and tracking one or more health metrics to determine the status of the system. The Health Monitoring ensures that the data is safely received and delivered for processing. One or more of the recorded health metrics can be compared to set parameters and displayed on the Health Monitoring Display. Information received from the MMPDS that has either higher or lower rates than the specified range represent out of range values. The out of range values can be presented using a color (e.g., Red) or textual indicators such as "high", "low". Additional indicators such as icons with a down arrow representing values lower than the specified range and an up arrow representing values higher than the specified range. Also, the received values can be displayed next to the specified range to indicate the out of range status. Other indicators, visual, audio and others that provide the necessary information can be used. Using the color indicator example, the values within optimal range can be displayed in green. Blue color can be used to indicate that no data is being received. Yellow color can represent values that do not apply to the health of the system.

Based on the information obtained by the Health Monitoring Processing modules, parameters can be determined for identifying a number of good or healthy tubes, a number of failed tubes, hits per epoch, tracks per epoch, and mean scattering angle, etc.

Additional Implementations

A detection system is implemented to fully integrate auxiliary detectors in addition to the charged particle detectors into a breadboard. Exemplary individual components of the system can include the MMPDS base array for charged particle tracking, and the separate neutron and gamma detectors in various configurations. The auxiliary data input channels can be implemented as a part of the MMPDS data architecture. A new analog to digital conversion board according to the disclosed technology can provide waveform digitization of pulses and delivery of this data for concurrent analysis with data from other sensors. The analog to digital conversion board can enable the analysis of signal shape which can be used to determine energy deposition in spectroscopic gamma detectors and discriminate neutron from gamma hits in other types of detectors, such as $^{10}$Boron based slow-neutron detectors.

Exemplary Multi-Detection Mode System

FIG. 7 shows an exemplary portable multi-detection mode system 800 that implements a cosmic-ray induced charged particle based nuclear interrogation and response platform. The exemplary portable multi-detection mode system 800 can be implemented on a mobile platform 824, 828 for deploying the portable multi-detection mode system 800 to a remote location to scan a suspicious vehicle, for example. The exemplary portable multi-detection mode system 800 shown in FIG. 7 integrates cosmic ray induced charged particle detectors (e.g., muon 816 trackers) 808, 810 along with gamma 818 detectors (e.g., spectroscopic gamma detectors) 812, 814 and fast neutron detectors 804, 806. The portable configuration of multi-detection mode system 800 shown in FIG. 7 includes two sets of multi-detection mode detectors 822 and 826 implemented on mobile platforms 824 and 828 with each set including various types of detectors as described above. The two sets of multi-detection mode detectors 822 and 826 are implemented on mobile platforms 824 and 828 for mobile deployment to scan a target vehicle 802 and track muons, gammas and fast neutrons interacting with a region of interest 830 that includes a fissionable material 832 in the target vehicle 802 for example.

In the configuration shown in FIG. 7, one set of multi-detection mode detectors 822 is implemented on mobile platform 824 for mobile deployment near one side of the vehicle 802. The other set of multi-detection mode detectors 826 is implemented on mobile platform 828 for mobile deployment near other side (e.g., opposing side) of the vehicle 802. The charged particle detectors 808 and 810 positioned on opposing sides of the vehicle 802 can detect and track charged particles entering and exiting the vehicle 802. The two sets of spectroscopic gamma detectors 812 and 814 can measure the energy of gamma rays 818 emitted from fissionable materials 832, when present, in the vehicle 802. The two sets of fast neutron detectors 804 and 806 can detect neutrons 820 emitted by the fissionable materials 832, when present, in the ROI 830 located in the vehicle 802 responsive to the fission of the materials 832.

The locations of the two sets of multi-detection mode detectors 822 and 826 can be varied. For example, the mobile platforms 824 and 828 can be implemented to position the two sets of multi-detection mode detectors 822 and 826 above and below the vehicle 802. In addition, the lateral and vertical positions of the two sets of multi-detection mode detectors 822 and 826 can be varied with respect to the vehicle 802 by adjusting the mobile platforms 824 and 828 in at least two planes (e.g., X- and Y-planes) with respect to the vehicle 802. In addition, the number of sets of multi-detection mode detectors can be varied. For example, four sets of multi-detection mode detectors can be implemented with the sets arranged above, below and at two sides of the vehicle 802 to create a box-like detection system. The various types of detectors for charged particle tracking, gamma measurement and fast neutron measurement are described below.

Detectors

A charged particle detector or tracker (e.g., charge particle detector 808, 810) can track charged particles before they enter and after exit from the inspection volume. Several tracking technologies can be implemented in a mobile platform such as the RV. Various general features of a charged particle tracker can impact the performance for implementation in the RV including the following examples:

1. Resolution of the tracking detector should provide angular resolution better than 5 mrad for 1 GeV muons.
2. Detector material density should be minimized to reduce scattering effects in the tracker, as well as increasing portability.
3. The tracker should use solid state detectors or detectors with sealed liquid or gas volumes. No flowing or cycling systems can be accommodated in the RV.
4. The tracker should be rugged, surviving up to 50 G impacts, commonly experienced in the handling of the system.
5. The electronics readout should be simple, minimizing required data transfer from the detector to the RV. Detectors requiring digitization of each signal/pulse from the detector should be avoided.
6. The number of electronics processing channels should be minimized. Large area coverage with a single electronics channel is desirable.

Sealed drift tubes can be used for various applications of detection modalities. The sealed drift tube is a type of ionization detector that produces electrical signals in response to ionizing particles or radiation that pass into or through its volume. The drift tube is a sealed, gas-filled cylinder that has conducting walls (cathode) and a fine wire element strung down the long axis of the tube (anode). A high voltage bias is maintained between the anode and the cathode. The gas in the drift tube mixture can be ionized by the passage of muons (causing electron-ion pairs) or by the incidence of gamma rays that cause Compton electrons to be released into the drift tube gas. Incident fast neutrons interact with $^4$He nuclei that are part of the drift tube gas, with the recoil of the $^4$He nucleus creating a local charge polarization that ionizes other gas molecules in proximity. After ionization, the electrons are swept by the drift due to the electric field towards the wire, while the ions are swept to the cathode. During their transit, the electrons collide with other gas molecules, ions, and electrons (although this last instance is rare), causing amplification of the charge in the gas ("avalanche" effect). The electrons and the positive ions reach the anode and the cathode respectively causing a current that can be detected by the drift tube electronics. Sealed drift tubes meet many of the features listed above. For example, sealed drift tubes are rugged, sealed, and simple.

While this document contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this document.

What is claimed is:

1. A multimode passive detection system, comprising:
charged particle tracking detectors to measure cosmic ray-based charged particle trajectories in a volume of interest;
fission product detectors to detect cosmic ray-based charged particle induced fission in a fissile material present in the volume of interest;
a conditioning circuitry electrically coupled to the charged particle tracking detectors to detect pulses from the charged particle tracking detectors, wherein the pulses correspond to passage of the cosmic ray-based charged particle through the charged particle tracking detectors;
the conditioning circuitry comprising a time to digital converter including a processor and a memory having instructions stored thereupon, wherein the instructions upon execution by the processor configures the time to digital converter to:
generate timing information associated with pulses detected by the conditioning circuitry; and dynamically adjust threshold levels to improve detection of pulses corresponding to passage of the cosmic ray-based charged particle through the charged particle tracking detectors.

2. The system of claim 1, wherein the charged particle tracking detectors include drift tubes.

3. The system of claim 1, wherein the charged particle tracking detectors are configured to detect muons.

4. The system of claim 3, wherein the fission product detectors include neutron detectors to detect neutron produced when muons interact with the nucleus of the fissile material.

5. The system of claim 4, wherein the fission product detectors include spectroscopic gamma detectors to detect gamma rays emitted when muons interact with the nucleus of the fissile material.

6. The system of claim 1, comprising:
a data merger for merging signals from the charged particle tracking detectors and the fission product detectors into a data stream.

7. The system of claim 1, comprising:
a data processing system to analyze signals from the charged particle tracking detectors and the fission product detectors and to identify the fissile material in the volume of interest as a special nuclear material.

8. The system of claim 7, wherein the special nuclear material includes fissionable $^{235}$Uranium and $^{239}$Plutonium.

9. The system of claim 1, wherein the charged particle tracking detectors and the fission product detectors are integrated into a single detection system.

10. The system of claim 1, further including at least two mobile platforms positioned to support the charged particle tracking detectors and the fission product detectors, and to enable mobile deployment of the multimode passive detection system.

11. The system of claim 10, wherein the at least two mobile platforms are adjustable in at least two planes.

12. A method of performing cosmic ray based tomographic imaging, the method comprising:
measuring, by charged particle tracking detectors, trajectories of cosmic ray-based charged particles entering and exiting a volume of interest;
detecting, by fission product detectors, cosmic ray-based charged particle induced fission in a fissile material present in the volume of interest;
detecting, using a conditioning circuitry, pulses from the charged particle tracking detectors, wherein the pulses correspond to passage of the cosmic ray-based charged particles through the charged particle tracking detectors;
generate, using a time to digital converter, timing information associated with pulses detected by the conditioning circuitry; and
dynamically adjusting threshold levels to improve detection of pulses corresponding to passage of the cosmic ray-based charged particles through the charged particle tracking detectors.

13. The method of claim 12, wherein the measuring is performed by the charged particle tracking detectors that include drift tubes.

14. The method of claim 12, wherein the measuring includes measuring trajectories of the cosmic ray-based charged particles that enter and stop in the fissile material present in the volume of interest.

15. The method of claim 12, wherein the measuring includes measuring trajectories of the cosmic ray-based charged particles that include negatively charged muons.

16. The method of claim 15, wherein the detecting includes using the fission product detectors that include neutron detectors to detect neutrons from the nuclear chain reaction generated initiated when muons induce a fission in the nucleus of the fissile material.

17. The method of claim 16, wherein the detecting includes using the fission product detectors that include gamma detectors to detect gammas emitted by muon induced fission.

18. The method of claim 12, comprising:
merging, by a data merger, signals from the charged particle tracking detectors and the fission product detectors into a data stream.

19. The method of claim 12, comprising:
analyzing, by a data processing system, signals from the charged particle tracking detectors and the fission product detectors to identify the fissile material in the volume of interest as a special nuclear material.

20. The method of claim 19, wherein the special nuclear material includes fissionable $^{235}$Uranium and $^{239}$Plutonium.

21. A portable multi-detection mode system, comprising:
a mobile platform comprising a plurality of sections movable to be positioned at different sides of an object under suspicion;
a set of charged particle detectors supported by the mobile platform such that at least one charged particle detector is positioned two of the sections of the mobile platform;
one or both of the following detector sets:
(a) a set of fast neutron detectors positioned at different sides of the object under suspicion, or
(b) a set of gamma ray detectors positioned at different sides of the object under suspicion;
detector electronic circuitry coupled to the set of charged particle detectors, and to the set of fast neutron detectors or the set of gamma ray detectors to produce electrical responses corresponding to detected charged particles, neutrons or gamma rays, the detector electronic circuitry further configured to detect pulses from the set of charged particle detectors, wherein the pulses correspond to passage of a cosmic ray-based charged particle through the set of charged particle detectors;
the detector electronic circuitry further comprising a time to digital converter including a processor and a memory having instructions stored thereupon, wherein the instructions upon execution by the processor configures the time to digital converter to:
generate timing information associated with pulses detected by the conditioning circuitry; and
dynamically adjust threshold levels to improve detection of pulses corresponding to passage of the cosmic ray-based charged particle through the set of charged particle detectors.

* * * * *